United States Patent
Apell et al.

(10) Patent No.: US 12,510,532 B2
(45) Date of Patent: Dec. 30, 2025

(54) GAS ANALYSIS SYSTEM FOR VEHICLES AND ARRANGEMENT OF SUCH SYSTEMS

(71) Applicant: ZF Friedrichshafen AG, Friedrichshafen (DE)

(72) Inventors: Johannes Apell, Hergensweiler (DE); Rene Seidemann, Friedrichshafen (DE); Julian King, Rankweil (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 339 days.

(21) Appl. No.: 18/171,056

(22) Filed: Feb. 17, 2023

(65) Prior Publication Data
US 2023/0266300 A1    Aug. 24, 2023

(30) Foreign Application Priority Data

Feb. 18, 2022   (DE) .......................... 102022201704.8

(51) Int. Cl.
*G01N 33/497*   (2006.01)
*B60H 1/00*   (2006.01)
(Continued)

(52) U.S. Cl.
CPC ..... *G01N 33/4972* (2013.01); *B60H 1/00271* (2013.01); *G01N 1/24* (2013.01); *B60K 28/063* (2013.01); *G01N 2001/245* (2013.01)

(58) Field of Classification Search
CPC ................ G01N 33/4972; G01N 1/24; G01N 2001/245; G01N 1/2252; G01N 33/004; G01N 33/0047; G01N 33/497; G01N 21/39; G01N 1/2226; G01N 1/2247; G01N 1/34; G01N 21/01; G01N 21/31; G01N 21/3504; G01N 33/98; G01N 33/4975; B60H 1/00271; B60H 1/00792; B60H 1/008;
(Continued)

(56) References Cited

FOREIGN PATENT DOCUMENTS

DE   10 2018 200 003 A1   7/2019
DE   10 2020 203 584 A1   9/2021
(Continued)

OTHER PUBLICATIONS

Office Action dated Oct. 14, 2022 for German Patent Application No. 10 2022 201 704.8 (12 pp.), note: pp. 1 and 2 are English language Explanations to Section C. Result of Determination Document.
(Continued)

*Primary Examiner* — Robert R Raevis
(74) *Attorney, Agent, or Firm* — Crowell & Moring LLP

(57) ABSTRACT

A gas analysis system for a vehicle includes a measurement chamber that includes at least one sensor configured for measuring substances in exhalations from vehicle occupants and/or the ambient air in a vehicle interior. The gas analysis system may also include at least one fan placed at a discharge opening for the system and designed to convey air through the measurement chamber, at least one filter located at an intake opening in the system and designed to prevent particles from contaminating the system; at least one first check valve, located between the measurement chamber and the fan, and designed to block a return-flow of the air out of the measurement chamber and/or ambient air from the vehicle interior into the measurement chamber, and a control unit, designed to regulate and/or control the conveyance of air through the measurement chamber.

14 Claims, 1 Drawing Sheet

(51) Int. Cl.
*G01N 1/24* (2006.01)
*B60K 28/06* (2006.01)

(58) Field of Classification Search
CPC .... B60K 28/063; B60K 28/06; A61B 5/0059;
A61B 5/0075; A61B 5/082; A61B 5/097;
A61B 5/4845; A61B 5/6893; B60W
40/08
USPC ..... 340/632–634; 73/23.2, 23.3, 23.4, 31.01,
73/31.02, 31.07, 863.31, 864.34, 864, 81;
600/532
See application file for complete search history.

(56) References Cited

FOREIGN PATENT DOCUMENTS

| | | |
|---|---|---|
| DE | 10 2021 201 498 A1 | 8/2022 |
| EP | 2 407 326 A1 | 1/2012 |
| WO | WO 2014/031071 A1 | 2/2014 |
| WO | WO 2016/200948 A1 | 12/2016 |

OTHER PUBLICATIONS

"Highly Selective Gas Sensing Enabled by Filters," Jan van den Broek et al., DOI: 10.1039/D0MH01453B (Review Article) Mater. Horiz., 2021, 8, Royal Society of Chemistry, pp. 661-684 (24 pp.)

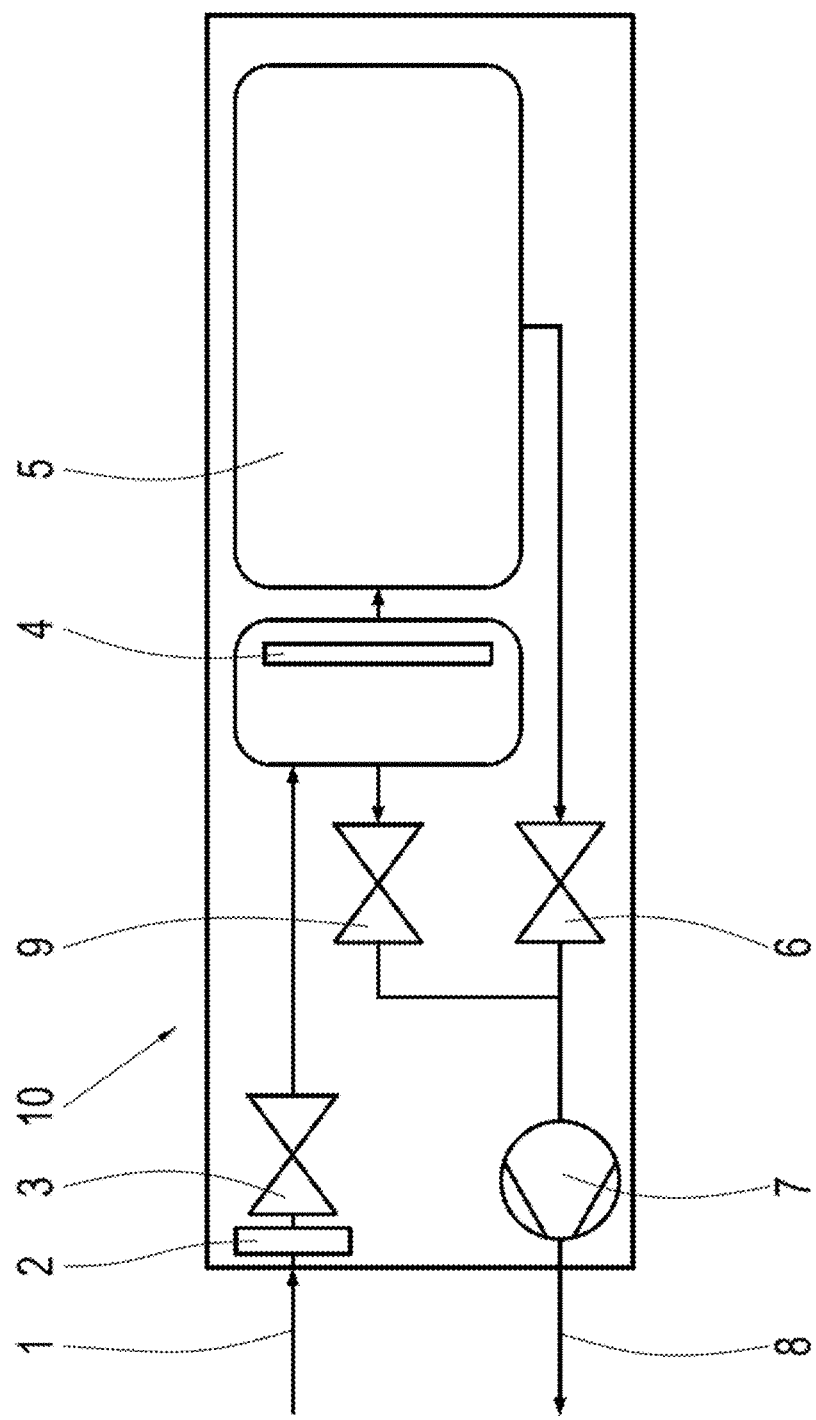

GAS ANALYSIS SYSTEM FOR VEHICLES AND ARRANGEMENT OF SUCH SYSTEMS

RELATED APPLICATION

This application claims the benefit of, and priority to, German Patent Application DE 10 2022 201 704.8, filed Feb. 18, 2022, which is hereby incorporated by reference herein in its entirety.

TECHNICAL FIELD

The invention relates to a gas analysis system for vehicles and an arrangement of such systems.

BACKGROUND

The following definitions, descriptions and explanations relate and apply to the subject matter of the entirety of the invention disclosed herein.

Driver monitoring is of increasingly greater importance for assisted and automated driving up to SAE J3016 level 4. Of primary importance is the early recognition of a driver's incapacity resulting from consumption of alcohol or other drugs. Analysis of exhaled air enables continuous physiological monitoring of the driver and/or vehicle occupants without any contact thereto in this context.

By way of example, DE 10 2020 203 584 A1 discloses a processing unit, a system, and a computer-implemented method for a vehicle interior for detecting and responding to the odors of a vehicle occupant. The German patent application with the file number 102021201498.4 discloses a method for monitoring a driver on the basis of trace gases. DE 10 2018 200 003 A1 discloses a method for breath analysis of vehicle occupants.

BRIEF DESCRIPTION

Because of legal regulations that have already been met for a compulsory alcohol interlock system in all vehicles and the imminent legalization of *cannabis* in parts of the EU and the United States, new methods for detecting driver incapacity as the result of alcohol and *cannabis* abuse are necessary. Despite gas-based alcohol detectors and breathalyzer-controlled ignition interlock devices that are already available, which are predominantly designed to detect a substance, there are still no equivalent means for detecting multiple substances that can be substantially miniaturized and installed in vehicles such that they are basically unobtrusive.

One problem is that undesired molecules and/or cross-reactions with other substances in the ambient air and exhalations end up in the analysis device, thus corrupting the values for the substances that are to be detected. In some cases, overlapping of the laser beam wave spectrums of various molecules and/or substances makes it impossible to detect a target substance.

The use of filters can remedy this and significantly reduce the presence of undesired molecules and/or cross-reactions with other substances. This requires keeping the filter surfaces clean, however. Dirty filters result in inaccurate measurements and more wear to the system, requiring increased maintenance for the odor detection system.

The object of the invention is therefore to create a gas analysis system for vehicles with which the problems specified above are resolved.

The subject matter of claim 1 solves these problems. Advantageous embodiments of the invention can be derived from the definitions, dependent claims, drawings, and descriptions of preferred exemplary embodiments.

The invention results in a gas analysis system for vehicles. The gas analysis system comprises:

a measurement chamber that comprises at least one sensor configured to detect substances in exhalations of vehicle occupants and/or the ambient air in a vehicle interior;

at least one fan placed at discharge opening for the system and designed to draw air through the measurement chamber;

at least one filter located at an intake opening in the system and designed to prevent particles from contaminating the system;

at least one first check valve, located between the measurement chamber and the fan, and designed to block a return-flow of the air out of the measurement chamber and/or ambient air from the vehicle interior into the measurement chamber;

a control unit, designed to regulate and/or control the conveyance of air through the measurement chamber, in which the control unit is designed to activate and deactivate the system and begin the measurement when a predefined carbon dioxide threshold value is reached in the measurement chamber.

The gas analysis system can measure substances in body odors contained in the air conveyed through the measurement chamber, for example. Body odors comprise all detectable human scents emitted through the skin or other bodily orifices, e.g. breath odors. Substances in exhalations and/or body odors can be substances indicating the presence of alcohol, cocaine, amphetamines, cannabinoids, morphine, methadone, ammonia, acetone, or a combination thereof. These substances represent biomarkers that can indicate a normal biological or abnormal process in the body. By way of example, the smell of ammonia indicates kidney disease. The smell of acetone indicates diabetes. One advantage in detecting these substances in the exhalations and/or body odors is that there is no need for chemical methods used to determine alcohol content, requiring the unpleasant process of blowing into a breathalyzer, or surface contact methods, e.g. adsorption methods, or invasive methods. Exhalations and other body odors are continuously emitted. The substances are volatile organic compounds, for example, also abbreviated as VOCs. VOCs include, e.g., acetone, ethanol, isoprene, nonanal, decanal, a-pinene, ethyl butyrate and butanal, ethanal, propionaldehyde, and propyl acetate. VOCs occur in animals in the course of protein, cellular, or metabolic changes triggered by a disease. By way of example, characteristic protein and metabolic changes have been observed in humans infected with SARS-Cov-2. VOCs emitted through exhalations and/or body odors can be characteristic for a disease, thus functioning as a biomarker.

The measurement chamber can comprise a polygonal, elliptical, or circular cross section, with reflective inner walls. Laser beams are reflected repeatedly off these reflective inner walls in the measurement chamber, with which the sensor is able to measure the substances through laser spectroscopy. These beams are therefore able to travel a distance through the measurement chamber that is greater than the diameter thereof. This makes it possible to miniaturize the measurement chamber for gas analysis in a vehicle, such that it can be placed within the vehicle's interior. This results in a measurement chamber that is extremely efficient, despite its small size, and is therefore suitable for measuring substances in the air within a vehicle.

By arranging the reflection surfaces in the shape of a polygon, it is possible to obtain a specific reflection angle.

A photodiode sensor is used for laser spectroscopic methods. According to one aspect of the invention, the measurement chamber comprises a laser that projects laser beams into the measurement chamber. According to one aspect of the invention, these laser beams are in the infrared spectrum.

Airflow through the system can be regulated and/or controlled by the fan. The fan generates a pressure difference and a suction airflow. The fan can be a ventilator.

The filter is configured to prevent coarse contaminants, viruses or bacteria from entering the system. The particles that are filtered out can be pollutants, harmful gases, particulates, viruses, bacteria, or special scents, e.g. perfumes.

The first check valve is configured to prevent contamination of the measurement chamber, for example. The check valve can be regulated and/or controlled electrically, magnetically, or electromagnetically.

The control unit can be an electric control unit, for example, or it can be an application-specific integrated circuit with a corresponding programmable system for suctioning in exhalations and/or ambient air, vacuuming off selectivity filters, and/or generating an air suction flow. According to one aspect of the invention, the control unit is embedded in the electrical system for the vehicle.

The carbon dioxide threshold value indicates a sufficient exhalation concentration of a driver, for example.

According to one aspect of the invention, the gas analysis system is integrated in a housing. The housing can be integrated in the vehicle. By way of example, the gas analysis system or the housing can be miniaturized so that it can be integrated in the vehicle.

The gas analysis system according to the invention can determine the state of a vehicle occupant, in particular a vehicle operator, with regard to illness and driving incapacity. If certain substances exceed a respective predefined threshold value, in particular when starting travel, a vehicle immobilizer is activated according to one aspect of the invention, e.g. an alcolock or breath alcohol ignition interlock device, which blocks the vehicle's ignition if the vehicle operator's breath alcohol exceeds a specific value.

According to another aspect of the invention an assembly is formed, comprising numerous gas analysis systems according to the invention, and an evaluation device, in which the gas analysis systems are connected in parallel and/or in series, and the evaluation device is configured to evaluate the measurements of all of the respective gas analysis systems.

The evaluation device can comprise application-specific integrated circuits, ASICs, field-programmable gate arrays, FPGAs, central processing units, CPUs, or graphics processing units, GPUs. The evaluation device can be a microcontroller or a control unit.

According to another aspect of the invention, the gas analysis system comprises a second check valve, located between the filter and the measurement system that is designed to prevent air from entering the system, and the control unit is configured to regulate and/or control the second check valve on the basis of air volume and/or the portion of carbon dioxide in the measurement chamber. The second check valve is normally closed, for example. In particular, when the system is not in use or being shipped, the second check valve can prevent air from entering the system. The control unit can be programmed to regulate and/or control the second check valve on the basis of a volumetric flow rate and/or carbon dioxide content. The second check valve can be activated to only allow a certain amount of the exhaled air to flow into the system.

According to another aspect of the invention, the control unit is configured to activate and/or deactivate the system at time intervals, input and/or evaluate signals from the vehicle interior sensors, and adjust the time intervals to the presence of vehicle occupants detected in the signals.

When the system is active, the fan can suction air through the system until the predefined carbon dioxide threshold value has been reached in the measurement chamber. Once this carbon dioxide threshold value is reached, the actual measurement is carried out in the measurement chamber for analysis of the substances. According to one aspect of the invention, the fan is deactivated during the measurement process, e.g. by the control unit. Once the analysis is completed, the fan can draw air from the measurement chamber and discharge it into the vehicle interior and/or a vehicle HVAC system.

The vehicle interior sensors can comprise a 2D/3D interior camera that records images of the vehicle occupants, a pedal sensor, e.g. a gas pedal sensor, a vehicle start-stop sensor, or part of a user interface, also referred to as a human-machine interface, in the vehicle.

According to another aspect of the invention, the gas analysis system comprises at least one selectivity filter, located between the filter or second check valve and the measurement chamber, which is configured to prevent certain substances from entering the measurement chamber. The selectivity filter is configured to prevent undesired molecules and/or cross reactions with other substances, in the air in the measurement chamber, which would impact the measurement values for substances that are to be detected.

The selectivity filter enables selectivity of substances in complex gas mixtures such as exhalations or ambient air. The selectivity filter can make use of reactivity with the material detected by the sensors, or additional properties of target substances, e.g. molecular size and/or surface affinity. By way of example, the selectivity filter can comprise sorbents, e.g. activated carbon, silica gels, or porous polymers with adjustable properties, microporous materials, e.g. zeolites and organometallic compounds, or heterogenous catalysts. The article, "Highly Selective Gas Sensing Enabled by Filters," Jan van den Broek et al., DOI: 10.1039/DOMH01453B (Review Article) Mater. Horiz., 2021, 8, 661-684, discloses an overview of selectivity filters.

According to another aspect of the invention, the gas analysis system comprises a third check valve, located between the selectivity filter and the fan and configured to block return flow of the air from the measurement chamber and/or the ambient air to the selectivity filter, in which the control unit is configured to open the third check valve after the measurement or after a time interval, close the first check valve, and clean the selectivity filter using the fan. The third check valve is configured to prevent contamination of the selectivity filter with reflux air.

The filter is cleaned by suctioning off the air with the fan, and opening and closing the check valves. Air is consequently drawn through the entire gas analysis system, such that the filter is cleaned by the suction and the associated movement of the air.

The gas analysis system thus combines various filters in a special arrangement with an intelligent, automatic self-cleaning of the filters and a special arrangement of valves.

According to another aspect of the invention, the system comprises an interface to a vehicle HVAC system. The vehicle HVAC system conveys air through the measurement chamber, is configured to prevent particles from entering the system, cleans the system of pollutants, and/or cleans the selectivity filter. The control unit is configured to regulate and/or control the vehicle HVAC system in accordance with the requirements for the system. The vehicle HVAC system can comprise a vehicle ventilator or air conditioning. The vehicle HVAC system can support or even replace the fan in the system according to one aspect of the invention. The vehicle HVAC system normally comprises components for cleaning and/or filtering air. These components can therefore also be used by the system.

According to another aspect of the invention, the selectivity filter is configured to prevent methanol, ethanol, isopropanol, acetone, formaldehydes, benzenes, ammonia, cannabinoids, or guaiacol from entering the measurement chamber.

Guaiacol is a substance that reacts at a certain temperature and becomes gaseous. The resulting gas can be detected in the measurement chamber and be used for early detection of fire, e.g. in the case of electrical fires.

According to another aspect of the invention, the sensor measures substances in exhalations and/or the ambient air using a laser spectroscopic method or comprises a chemiresistor material, metal oxide material, or quartz oscillator for measuring the substances, or the measurement chamber comprises numerous sensors of the types specified above, and/or a combination of these sensors. Laser spectroscopic methods comprise absorption spectroscopy and emission spectroscopy.

According to another aspect of the invention, the gas analysis system comprises a heater. The heater heats the measurement chamber and/or the gas analysis system. This is configured to prevent condensation from forming in the measurement chamber.

In another embodiment of the assembly according to the invention, the gas analysis systems comprise different selectivity filters, and the evaluation device is configured to evaluate numerous substances in the air. By way of example, alcohol, ethanol, *cannabis*, or fire can be selectively measured using the indicator substances guaiacol, methanol, isopropanol, or carbon dioxide, and cross correlations can be prevented.

According to another aspect of the invention, the evaluation device is configured to determine differences in the measurements of the substances measured in the gas analysis systems. This increases measurement precision, and allows for cross checking of the measurements.

According another aspect of the invention, the gas analysis system or the assembly can be placed near the steering wheel, or on or in the steering wheel in a vehicle. This reduces the distance between the vehicle occupants and the gas analysis system, e.g. to 20 cm, which has advantages with regard to the measurement of substances in exhalations. The various installation locations include the cockpit, the rim of the steering wheel, the spokes on the steering wheel, the steering column, or the horn button. By way of example, the housing in which the gas analysis system is integrated can be placed on the steering column.

BRIEF DESCRIPTION OF THE DRAWINGS

The invention is illustrated in the exemplary embodiment shown in FIG. 1. FIG. 1 shows a gas analysis system according to the invention.

All of the valves in the illustration are check valves for the indicated direction of flow.

DETAILED DESCRIPTION

The exhalation and/or ambient air 1 flows into the system 10. The system 10 can be integrated at various locations in the vehicle, e.g. a passenger automobile, bus, truck, people mover, e.g. near the steering wheel, in the steering wheel itself, as a separate housing behind the steering wheel, and it can also be combined with other sensors, e.g. a 2D/3D camera.

A filter 2 is configured to prevent course air from entering the system.

A normally closed second check valve 3 is configured to prevent air from entering the system 10, e.g. when not in use or while the system is being shipped. The second check valve 3 can be activated by an external circuit, e.g. in order to allow only a certain amount of the exhalations to flow into the system on the basis of the flow rate or the carbon dioxide content.

A selectivity filter 4 is configured to prevent specific defined molecules/substances from entering the measurement chamber 5.

The exhalation and/or ambient air 1 is suctioned into the system 10 by the fan 7. A first check valve 6 is configured to prevent air, e.g. from the vehicle interior or the vehicle HVAC 8 from flowing back into the measurement chamber 5, thus preventing contamination of the measurement chamber 5.

The time intervals for activating and/or deactivating the system 10, e.g. the air suction process and analysis in the measurement chamber 10, can be regulated on an individual basis via a control unit, and further supplemented by other sensors, e.g. a 2D/3D camera, gas pedal sensor, vehicle start-stop sensor, and HMI system. When the system 10 is active, the fan 7 suctions exhalation/ambient air 1 through the system 10 and analyzes it, until a predefined carbon dioxide threshold value is reached in the measurement chamber 5. This carbon dioxide threshold value indicates a sufficient exhalation concentration from a driver. The actual measurement for the analysis of the substances is carried out in the measurement chamber 5 when this carbon dioxide threshold value is reached. The fan 7 can also be shut off briefly at this point.

The measurement chamber 5 can contain numerous sensors of different types, e.g. laser spectroscopy, metal oxide, and electro-chemical resistor or quartz crystal oscillator sensors.

Alternatively, suctioning up the exhalation and/or ambient air 1, vacuuming off the selectivity filter 4 and/or generating an air suction flow by the fan 7 can also be assumed by the vehicle HVAC system 8. This vehicle HVAC system can also clean/filter the ambient air 1 and/or system exhaust with regard to pollutants, harmful gases, particulate matter or odors.

Once the analysis is completed, the air is drawn out of the measurement chamber 5 and discharged into the vehicle interior and/or the vehicle HVAC system 8. After measurement or a predefined time interval, the third check valve 9 is opened, the first check valve 6 is closed, and any particles/molecules are vacuumed off of the selectivity filter 4 by the fan 7 or the vehicle HVAC system 8. In particular, the third check valve 9 is configured to prevent contamination of the selectivity filter 4 by reflux air.

The system 10 can also be operated in a multiple, parallel or serial, assembly, such that differently configured selectivity filters 4 can filter out different molecules in the air, allowing them to be measured and analyzed in the different measurement chambers 5. As a result, numerous different substances can be detected in the exhalation and/or ambient air 1 in a system 10. These substances can be, e.g., alcohol, ethanol, *cannabis*, fire through the use of the indicator substance guaiacol, methanol, isopropanol, or carbon dioxide. It is also possible to measure the different levels of the molecules in the measurement chamber 5 with a parallel or serial embodiment.

REFERENCE SYMBOLS

10 gas analysis system
1 exhalation/ambient air
2 filter
3 second check valve
4 selectivity filter
5 measurement chamber
6 first check valve
7 fan
8 vehicle HVAC system
9 third check valve

The invention claimed is:

1. A gas analysis system for a vehicle, comprising:
  a measurement chamber that comprises at least one sensor configured for measuring substances in at least one of exhalations from vehicle occupants and ambient air in a vehicle interior;
  at least one fan placed at a discharge opening for the system and configured to convey air through the measurement chamber;
  at least one filter located at an intake opening in the system and configured to prevent particles from contaminating the system;
  at least one first check valve, located between the measurement chamber and the fan, and configured to block a return-flow of the air out of the measurement chamber and/or ambient air from the vehicle interior into the measurement chamber; and
  a control unit configured to regulate and/or control the conveyance of air through the measurement chamber, wherein the control unit is configured to activate and deactivate the system and begin the measurement when a predefined carbon dioxide threshold value is reached in the measurement chamber.

2. The gas analysis system according to claim 1,
  further comprising a second check valve, located between the filter and the measurement chamber, and configured to prevent air from entering the system,
  wherein the control unit is configured to regulate and/or control the second check valve on the basis of an air volume and/or the portion of carbon dioxide in the measurement chamber.

3. The gas analysis system according to claim 2, comprising at least one selectivity filter located between the second check valve, and the measurement chamber, and configured to prevent predefined substances from entering the measurement chamber.

4. The gas analysis system according to claim 1, wherein the control unit is configured to activate and/or deactivate the system in time intervals, input and/or evaluate signals from vehicle interior sensors, and adjust the time intervals to the presence of vehicle occupants detected with the signals.

5. The gas analysis system according to claim 4, wherein the selectivity filter is configured to prevent methanol, ethanol, isopropanol, acetone, formaldehydes, benzenes, cannabinoids, or guaiacol from entering the measurement chamber.

6. The gas analysis system of claim 5, wherein a vehicle HVAC system cleans the selectivity filter, and wherein the control unit is configured to regulate and/or control the vehicle HVAC system in accordance with a requirement for the system.

7. The gas analysis system according to claim 4, comprising a third check valve, located between the selectivity filter and the fan, and configured to block a return flow of air from the measurement chamber and/or the ambient air to the selectivity filter, wherein the control unit is configured to open the third check valve, close the first check valve, and clean the selectivity filter with the fan after the measurement or after a time interval.

8. The gas analysis system according to claim 1, wherein the system comprises an interface to a vehicle HVAC system, and the vehicle HVAC system conveys air through the measurement chamber, at least partially is configured to prevent particles from entering the system, and cleans the system of any particles that have entered it.

9. The gas analysis system according to claim 1, wherein the sensor measures the substances in the exhalation and/or ambient air in accordance with a laser spectroscopic method, or comprises a chemiresistor material, metal oxide material, or quartz oscillator for measuring the substances, or wherein the measurement chamber comprises numerous sensors of the types specified above.

10. The gas analysis system according to claim 1, further comprising a heater.

11. An assembly comprising numerous gas analysis systems according to claim 1, and further comprising an evaluation device, wherein the gas analysis systems are arranged in parallel and/or in series, and the evaluation device is configured to evaluate the measurements of all of the respective gas analysis systems.

12. The assembly according to claim 11, wherein the gas analysis systems respectively comprise selectivity filters of different types.

13. The assembly according to claim 11, wherein the evaluation device is configured to measure the differences in the amounts of the substances measured in gas analysis systems.

14. The gas analysis system according to claim 1, wherein the gas analyses system is configured for placement near a steering wheel or on or in the steering wheel in a vehicle.

* * * * *